US012793973B2

(12) United States Patent
Zhang et al.

(10) Patent No.: US 12,793,973 B2
(45) Date of Patent: Nov. 10, 2026

(54) POSITIVE ELECTRODE ACTIVE MATERIAL FOR SECONDARY BATTERIES, AND SECONDARY BATTERY

(71) Applicant: Panasonic Intellectual Property Management Co., Ltd., Osaka (JP)

(72) Inventors: Jin Zhang, Osaka Fu (JP); Issei Ikeuchi, Osaka Fu (JP); Mitsuhiro Hibino, Kyoto Fu (JP); Kensuke Nakura, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 745 days.

(21) Appl. No.: 18/023,214

(22) PCT Filed: Jul. 7, 2021

(86) PCT No.: PCT/JP2021/025570
§ 371 (c)(1),
(2) Date: Feb. 24, 2023

(87) PCT Pub. No.: WO2022/044554
PCT Pub. Date: Mar. 3, 2022

(65) Prior Publication Data

US 2023/0335729 A1 Oct. 19, 2023

(30) Foreign Application Priority Data

Aug. 31, 2020 (JP) ................................ 2020-146217

(51) Int. Cl.
*H01M 4/525* (2010.01)
*H01M 50/46* (2021.01)
*H01M 4/02* (2006.01)

(52) U.S. Cl.
CPC ........... *H01M 4/525* (2013.01); *H01M 50/46* (2021.01); *H01M 2004/021* (2013.01); *H01M 2004/028* (2013.01)

(58) Field of Classification Search
CPC ....... H01M 4/525; H01M 4/485; H01M 4/505
See application file for complete search history.

(56) References Cited

U.S. PATENT DOCUMENTS

2001/0024754 A1* 9/2001 Fukuzawa .......... C01G 45/1228
429/231.95
2016/0049640 A1 2/2016 Takeuchi et al.
(Continued)

FOREIGN PATENT DOCUMENTS

EP 3595058 A1 1/2020
JP 2015-22958 A 2/2015
(Continued)

OTHER PUBLICATIONS

Mahara, "How Fluorine Introduction Solves the Spinel Transition, a Fundamental Problem of Mn-Based Positive Electrodes", ACS Appl. Mater. Interfaces 2022, 14, 21, 24321-24331, https://doi.org/10.1021/acsami.2c02868 (Year: 2022).*
(Continued)

*Primary Examiner* — Maria Laios
*Assistant Examiner* — Ziheng Lu
(74) *Attorney, Agent, or Firm* — WHDA, LLP

(57) ABSTRACT

A positive electrode active material for a secondary battery has a lithium metal composite oxide having a crystal structure based on a rock salt structure belonging to a space group Fm-3m, and the crystal structure has a vacancy to which no lithium or metal atom is disposed. For the lithium metal composite oxide, for example, a composite oxide represented by a composition formula $Li_aMn_bM_cO_{2-d}F_d$ (where M is at least one metal element excluding Li and Mn,
(Continued)

$0<a\leq1.4$, $0.4\leq b\leq0.95$, $0\leq c\leq0.2$, $0\leq d\leq0.66$, and $1.75\leq a+b+c<2$ are satisfied) can be used.

2 Claims, 1 Drawing Sheet

(56) References Cited

U.S. PATENT DOCUMENTS

| | | | |
|---|---|---|---|
| 2017/0244103 A1 | 8/2017 | Natsui et al. | |
| 2018/0090747 A1 | 3/2018 | Natsui et al. | |
| 2018/0090757 A1 | 3/2018 | Ikeuchi et al. | |
| 2018/0138496 A1 | 5/2018 | Ikeuchi et al. | |
| 2019/0198861 A1 | 6/2019 | Natsui et al. | |
| 2020/0020943 A1* | 1/2020 | Natsui | C01B 25/455 |

FOREIGN PATENT DOCUMENTS

| | | | | |
|---|---|---|---|---|
| JP | 2017-152369 A | | 8/2017 | |
| JP | 6197029 B2 | | 9/2017 | |
| JP | 2018-56114 A | | 4/2018 | |
| WO | 2017/013848 A1 | | 1/2017 | |
| WO | WO-2018163519 A1 | * | 9/2018 | H01M 4/364 |
| WO | 2018/190048 A1 | | 10/2018 | |
| WO | 2020/049794 A1 | | 3/2020 | |

OTHER PUBLICATIONS

International Search Report dated Sep. 7, 2021, issued in counterpart International Application No. PCT/JP2021/025570 (2 pages).

Extended (Supplementary) European Search Report dated Jan. 24, 2024, issued in counterpart EP Application No. 21860984.0. (7 pages).

Office Action dated Jul. 23, 2025, issued in counterpart CN Application No. 202180052397.7, with partial English translation.(8 pages).

Office Action dated Jan. 30, 2026, issued in counterpart EP Application No. 21860984.0. (5 pages).

* cited by examiner

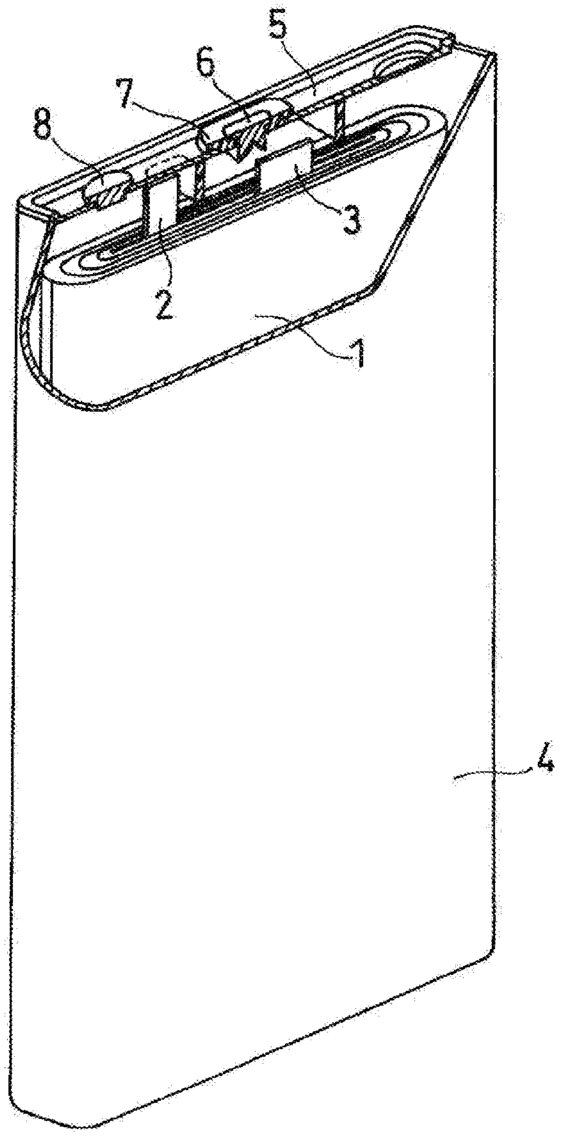
5
6
7
8
3
2
1
4

POSITIVE ELECTRODE ACTIVE MATERIAL FOR SECONDARY BATTERIES, AND SECONDARY BATTERY

CROSS-REFERENCE TO RELATED APPLICATION

This application is a National Phase Application filed under 35 U.S.C. 8371 of International Application No. PCT/JP2021/025570 filed on Jul. 7, 2021 which claims the benefit of priority under 35 U.S.C. § 119 (a) of Japanese Patent Application No. 2020-146217 filed in Japan on Aug. 31, 2020, the contents of which are incorporated herein by reference.

TECHNICAL FIELD

The present disclosure relates to a secondary battery, particularly to an improvement of a positive electrode used for a secondary battery.

BACKGROUND ART

Secondary batteries, particularly lithium ion secondary batteries, are expected as a power source for small consumer applications, power storage devices, and electric vehicles, because of their high output and high energy density. For positive electrode active materials of lithium ion secondary batteries, a composite oxide of lithium and a transition metal (e.g., cobalt) is used. A high capacity can be achieved by replacing a portion of cobalt with nickel.

Meanwhile, recently, with a demand for a high energy density, a Li-excess type lithium metal composite oxide based on a rock salt structured $Li_xMn_{1-x}O_2$ has been gaining attention.

Patent Literature 1 has disclosed a positive electrode active material including a lithium transition metal composite oxide having a crystal structure belonging to a space group Fm-3m, and represented by a composition formula $Li_{1+x}Nb_yMe_zA_pO_2$ (Me is a transition metal including Fe and/or Mn, $0<x<1$, $0<y<0.5$, $0.25\leq z<1$, A is an element other than Nb and Me, $0\leq p\leq 0.2$, where $Li_{1+p}Fe_{1-q}Nb_qO_2$ and $0.15<p\leq 0.3$, $0<q\leq 0.3$ is excluded).

CITATION LIST

Patent Literature

Patent Literature 1: Japanese Patent No. 6197029 specification

SUMMARY OF INVENTION

Patent Literature 1 enables a high capacity by controlling the composition (that is, addition of Nb). However, the effects of capacity improvement are insufficient, and there is still room for improvement.

In view of the above, an aspect of the present disclosure relates to a positive electrode active material for a secondary battery including a lithium metal composite oxide, the lithium metal composite oxide having a crystal structure based on a rock salt structure belonging to a space group Fm-3m, wherein the crystal structure has a vacancy to which no lithium or metal atom is disposed.

Another aspect of the present disclosure relates to a secondary battery including a positive electrode, a negative electrode, an electrolyte, and a separator interposed between the positive electrode and the negative electrode, wherein the positive electrode includes the above-described positive electrode active material for a secondary battery.

The present disclosure allows for realizing a secondary battery with a high energy density.

BRIEF DESCRIPTION OF DRAWINGS

FIG. 1 is a schematic partially cutaway oblique view of a secondary battery in an embodiment of the present disclosure.

DESCRIPTION OF EMBODIMENTS

The positive electrode active material for a secondary battery of the embodiment of the present disclosure includes a lithium metal composite oxide having a crystal structure based on a rock salt structure belonging to a space group Fm-3m. That is, the lithium metal composite oxide has a crystal structure similar to that of the rock salt structure belonging to the space group Fm-3m, and the crystal structure has a vacancy to which no lithium or metal atom is disposed. Here, having a vacancy means that in the positive electrode active material taken out from a disassembled secondary battery immediately after production or in discharged state, vacancies that are not occupied with Li atoms or metal atoms are present in the lithium metal composite oxide. The ratio of the vacancies may be 0.5% or more, preferably 1% or more, more preferably 2% or more of the sites to which lithium atoms or metal atoms may be coordinated in the crystal structure.

The above-described lithium metal composite oxide has a crystal structure based on, for example, a rock salt structure represented by NaCl, and oxygen atoms are disposed to the anion site, and Li atoms and metal atoms other than Li are disposed randomly to the cation site. However, a portion of the cation sites is vacant without any of Li atoms or metal atoms being disposed. The vacancies allow for lithium ions to move easily and increase in the capacity.

Examples of the lithium metal composite oxide include one represented by a composition formula $Li_aMn_bMn_cO_{2-d}F_d$ (where $0<a\leq 1.4$, $0.4\leq b\leq 0.95$, $0\leq c\leq 0.2$, $0\leq d\leq 0.66$, and $1.75\leq a+b+c<2$ are satisfied). M is at least one metal element excluding Li and Mn. In the above-described composition formula, x represented by $2-a-b-c$ ($=x$) represents a molar ratio of vacancies present in the cation sites. From the above-described composition formula, the molar ratio x of vacancies is $0<x\leq 0.25$. Preferably, the molar ratio x of the vacancies is $x\geq 0.02$, more preferably $x\geq 0.05$, even more preferably $x\geq 0.1$. In other words, $a+b+c\leq 1.98$ is preferable, $a+b+c\leq 1.95$ is more preferable, and $a+b+c\leq 1.9$ is even more preferable. The molar ratio x of the vacancies is more preferably $x\leq 0.15$ ($a+b+c\geq 1.85$).

The vacancy and the vacancy content can be determined based on the crystal structure and the composition of the lithium metal composite oxide. For example, in the case of the crystal structure similar to the rock salt structure belonging to a space group Fm-3m, the vacancy content can be determined by calculating $x=2-a-b-c$ from the above-described composition formula. The crystal structure of the lithium metal composite oxide is identified based on X-ray diffraction pattern analyzed with a powder X-ray diffraction device (e.g., desktop X-ray diffraction device manufactured by Rigaku Corporation, MiniFlex, X-ray source: CuKα). The composition of the lithium metal composite oxide can be measured with an ICP emission spectroscopy device (iCAP6300 manufactured by Thermo Fisher Scientific).

The vacancy and the vacancy content can be evaluated also by a method using positron annihilation.

As shown in the above-described composition formula, a portion of the oxygen atoms in the anion sites may be replaced with fluorine atoms. In this manner, the state of Li-excess is stabilized. Also, introduction of fluorine atoms increases the average discharge potential. In the above-described lithium metal composite oxide, Li atoms are randomly placed in the cation sites and the Li bonding state is various; therefore, the voltage distribution involved with the Li release is wide. Therefore, end portion of the low potential side in the voltage distribution may be difficult to be used for a capacity. However, introduction of fluorine atoms allows for the voltage distribution involved with the Li release to move toward the high potential side, and this allows for the end portion to be easily used for a capacity. In this way, available capacity increases even more.

When a portion of the oxygen atoms is replaced with fluorine atoms, the replacement ratio d of the fluorine atom in the composition formula of the lithium metal composite oxide may be $0.1 \le d \le 0.58$, or $0.1 \le d \le 0.5$, or $0.2 \le d \le 0.5$.

The lithium metal composite oxide may include a metal element M other than Li and Mn. The lithium metal composite oxide may include, as the metal element M, at least one selected from the group consisting of Ni, Co, Sn, Cu, Nb, Mo, Bi, V, Cr, Y, Zr, Zn, Na, K, Ca, Mg, Pt, Au, Ag, Ru, Ta, W, La, Ce, Pr, Sm, Eu, Dy. and Er. Preferably, the lithium metal composite oxide includes, as the metal element M, at least one selected from the group consisting of Ni, Sn, Mo, W, Ta, and Zn.

The above-described lithium metal composite oxide can be synthesized, for example, by mixing lithium peroxide ($Li_2O_2$), lithium fluoride (LiF), and lithium manganate ($LiMnO_2$) in an inert gas atmosphere such as Ar in a planetary ball mill. For the raw materials, $Li_2O$ and $Mn_2O_3$ can be used. Instead of the planetary ball mill, a mixer that can give a similar shearing force in mixing to powder can be used, or the powder can be heated during the mixing. The composition of the composite oxide can be adjusted to a target range by changing, for example, the mixing ratio of LiF to $LiMuO_2$, and mixing conditions (number of revolutions, mixing time, mixing temperature, etc.).

Next, a secondary battery of the embodiment of the present disclosure is described. The secondary battery includes, for example, the following positive electrode, negative electrode, electrolyte, and separator.

[Positive Electrode]

The positive electrode has a positive electrode current collector and a positive electrode mixture layer formed on a surface of the positive electrode current collector and having a positive electrode active material. The positive electrode mixture layer can be formed, for example, by applying a positive electrode slurry on a surface of the positive electrode current collector, and drying the slurry; in the positive electrode slurry, the positive electrode mixture including a positive electrode active material, a binder and the like is dispersed in a dispersion medium. The dried coating film may be rolled, if necessary. The positive electrode mixture layer may be formed on one surface of the positive electrode current collector, or may be formed on both surfaces thereof.

The positive electrode mixture layer contains a positive electrode active material as an essential component, and as an optional component, a binder, a conductive material, a thickener, a positive electrode additive or the like. For the binder, thickener, and conductive material, known materials can be used.

The positive electrode active material includes the above-described lithium metal composite oxide having a crystal structure similar to the rock salt structure belonging to a space group Fm-3m. The composite oxide is, for example, secondary particles composed of a plurality of coagulated primary particles. The primary particles have a particle size of, generally 0.05 μm to 1 μm. The composite oxide has an average particle size of, for example, 3 μm to 30 μm, preferably 5 μm to 25 μm. Here, the average particle size of the composite oxide means a median diameter (D50) at which cumulative frequency is 50% in a volume-based particle size distribution measured with a laser diffraction particle size distribution analyzer.

The amount of the elements contained and forming the composite oxide can be measured by an inductively coupled plasma emission spectroscopic analyzer (ICP-AES), electron probe micro analyzer (EPMA), energy dispersive X-ray analyzer (EDX), etc.

For the positive electrode active material, other known lithium metal oxides may be mixed with the above-described lithium metal composite oxide having a crystal structure similar to the rock salt structure. Examples of the other lithium metal oxide include a lithium transition metal composite oxide such as $Li_aCoO_2$, $Li_aNiO_2$, $Li_aMnO_2$, $Li_aCo_bNi_{1-b}O_2$, $Li_aCo_bM_{1-b}O_c$, $Li_aNi_{1-b}M_bO_c$, $Li_aMn_2O_4$, $Li_aMn_{2-b}M_bO_4$, $LiMePO_4$, and $Li_2MePO_4F$. Here, M is at least one selected from the group consisting of Na, Mg, Sc, Y, Mn, Fe, Co, Ni, Cu, Zn, Al, Cr, Pb, Sb, and B. Me includes at least a transition element (e.g., at least one element selected from the group consisting of Mn, Fe, Co, and Ni). Here, $0 \le a \le 1.2$, $0 \le b \le 0.9$, and $2.0 \le c \le 2.3$. Note that the value "a" indicating the molar ratio of lithium is increased or decreased by charging and discharging.

The shape and thickness of the positive electrode current collector can be selected from the shapes and ranges according to the negative electrode current collector. Examples of the material for the positive electrode current collector include stainless steel, aluminum, aluminum alloy, titanium, or the like.

[Negative Electrode]

The negative electrode includes, for example, a negative electrode current collector, and a negative electrode active material layer formed on the surface of the negative electrode current collector. The negative electrode active material layer can be formed, for example, by applying a negative electrode slurry on a surface of the negative electrode current collector and drying the slurry; in the negative electrode slurry, the negative electrode mixture including a negative electrode active material, a binder and the like is dispersed in a dispersion medium. The dried coating film may be rolled, if necessary. That is, the negative electrode active material can be a mixture layer. A lithium metal foil or a lithium alloy foil may be attached to the negative electrode current collector. The negative electrode active material layer may be formed on one surface of the negative electrode current collector, or may be formed on both surfaces thereof.

The negative electrode active material layer contains a negative electrode active material as an essential component, and as an optional component, a binder, a conductive material, a thickener, and the like can be included. For the binder, conductive material, and thickener, known materials can be used.

The negative electrode active material contains a material that electrochemically stores and releases lithium ions, a lithium metal, and/or a lithium alloy. For the material that electrochemically stores and releases lithium ions, a carbon material, an alloy based material, and the like are used. Examples of the carbon material include, for example, graphite, graphitizable carbon (soft carbon), and non-graphitizable carbon (hard carbon). Preferred among them is graphite, which is excellent in stability during charging and discharging and has a small irreversible capacity. For the alloy based material, a material containing at least one metal that forms an alloy with lithium can be used, and examples thereof include silicon, tin, a silicon alloy, a tin alloy, and a silicon compound. Silicon oxides, tin oxides of these bonded with oxygen or the like can be used.

For the alloy based material containing silicon, for example, a silicon composite material in which a lithium ion conductive phase and silicon particles dispersed in the lithium ion conductive phase can be used. For the lithium ion conductive phase, for example, a silicon oxide phase, a silicate phase, and/or a carbon phase can be used. A main component (e.g., 95 to 100 mass %) of the silicon oxide phase can be silicon dioxide. Among these, a composite material composed of a silicate phase and silicon particles dispersed in the silicate phase is preferable because it has a high capacity and a small irreversible capacity.

The silicate phase may include, for example, at least one selected from the group consisting of Group 1 elements and Group 2 elements of the long-form periodic table. Examples of Group 1 elements and Group 2 elements of the long-form periodic table include lithium (Li), potassium (K), sodium (Na), magnesium (Mg), calcium (Ca), strontium (Sr), barium (Ba), and the like. Other elements may include aluminum (Al), boron (B), lanthanum (La), phosphorus (P), zirconium (Zr), titanium (Ti), etc. In particular, the silicate phase containing lithium (hereinafter also referred to as lithium silicate phase) is preferable because of its small irreversible capacity and high initial charge/discharge efficiency.

The lithium silicate phase may be any oxide phase containing lithium (Li), silicon (Si), and oxygen (O), and may include other elements. The atomic ratio O/Si of O to Si in the lithium silicate phase is, for example, larger than 2 and less than 4. Preferably, O/Si is larger than 2 and less than 3. The atomic ratio Li/Si of Li to Si in the lithium silicate phase is, for example, larger than 0 and less than 4. The lithium silicate phase may have a composition represented by the formula: $Li_{2z}SiO_{2+z}$ ($0<z<2$). Preferably, the relation $0<z<1$ is satisfied, and $z=1/2$ is more preferable. Examples of the elements other than Li, Si, and O that can be contained in the lithium silicate phase include iron (Fe), chromium (Cr), nickel (Ni), manganese (Mn), copper (Cu), molybdenum (Mo), zinc (Zn), aluminum (Al), etc.

The carbon phase can be composed of, for example, amorphous carbon which is less crystalline. The amorphous carbon may be, for example, hard carbon, soft carbon, or something else.

As the negative electrode current collector, a non-porous conductive substrate (metal foil, etc.), and a porous conductive substrate (mesh-body, net-body, punched sheet, etc.) are used. For the material of the negative electrode current collector, stainless steel, nickel, nickel alloy, copper, copper alloy, or the like can be exemplified.

[Electrolyte]

The electrolyte includes a solvent and a solute dissolved in the solvent. The solute is an electrolytic salt that goes through ion dissociation in electrolytes. The solute may include, for example, a lithium salt. The component of the electrolyte other than the solvent and solute is additives. The electrolyte may contain various additives. The electrolyte is generally used in a liquid state, but may be in a state in which its flowability is limited with a gelling agent and the like.

For the solvent, an aqueous solvent or a non-aqueous solvent is used. As the non-aqueous solvent, a cyclic carbonate, a chain carbonate, a cyclic carboxylate, and a chain carboxylate are exemplified. Examples of the cyclic carbonate include propylene carbonate (PC), ethylene carbonate (EC), and vinylene carbonate (VC). Examples of the chain carbonate include diethyl carbonate (DEC), ethyl methyl carbonate (EMC), dimethyl carbonate (DMC). Examples of the cyclic carboxylate include γ-butyrolactone (GBL) and γ-valerolactone (GVL). Examples of the chain carboxylate include methyl acetate, ethyl acetate, propyl acetate, methyl propionate (MP), ethyl propionate (EP), and the like. A kind of non-aqueous solvent may be used singly, or two or more kinds thereof may be used in combination.

Examples of the non-aqueous solvent also include cyclic ethers, chain ethers, nitriles such as acetonitrile, and amides such as dimethylformamide.

Examples of the cyclic ether include 1,3-dioxolane, 4-methyl-1,3-dioxolane, tetrahydrofuran, 2-methyl tetrahydrofuran, propylene oxide, 1,2-butylene oxide, 1,3-dioxane, 1,4-dioxane, 1,3,5-trioxane, furan, 2-methyl-furan, 1,8-cineol, and crown ether.

Examples of the chain ether include 1,2-dimethoxyethane, dimethyl ether, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxy benzene, 1,2-diethoxyethane, 1,2-dibutoxy ethane, diethylene glycol dimethylether, diethylene glycol diethyl ether, diethylene glycol dibutyl ether, 1,1-dimethoxy methane, 1,1-diethoxy ethane, triethylene glycol dimethylether, tetraethylene glycol dimethyl ether, and the like.

These solvents may be a fluorinated solvent in which hydrogen atoms are partly substituted with a fluorine atom. Fluoro ethylene carbonate (FEC) may be used as the fluorinated solvent.

For the lithium salt, for example, lithium salts of chlorine-containing acid ($LiClO_4$, $LiAlCl_4$, $LiB_{10}Cl_{10}$, etc.), lithium salts of fluorine-containing acid ($LiPF_6$, $LiPF_2O_2$, $LiBF_4$, $LiSbF_6$, $LiAsF_6$, $LiCF_3SO_3$, $LiCF_3CO_2$, etc.), lithium salts of fluorine-containing acid imide ($LiN(FSO_2)_2$, $LiN(CF_3SO_2)_2$, $LiN(CF_3SO_2)(C_4F_9SO_2)$, $LiN(C_2F_5SO_2)_2$, etc.), lithium halides (LiCl, LiBr, LiI, etc.) and the like can be used. A kind of lithium salt may be used singly, or two or more kinds thereof may be used in combination.

The electrolyte may have a lithium salt concentration of 1 mol/liter or more and 2 mol/liter or less, or 1 mol/liter or more and 1.5 mol/liter or less. With the lithium salt concentration set to be within the above-described range, an electrolyte having an excellent ion conductivity and a suitable viscosity can be prepared. However, the lithium salt concentration is not limited to the above-described range.

The electrolyte may contain other known additives. Examples of the additive include 1,3-propanesultone, methylbenzenesulfonate, cyclohexylbenzene, biphenyl, diphenyl ether, and fluorobenzene.

[Separator]

A separator is interposed between the positive electrode and the negative electrode. The separator has excellent ion permeability, and suitable mechanical strength and electrically insulating properties. As the separator, a microporous thin film, a woven fabric, a nonwoven fabric, and the like may be used. The separator is preferably made of polyolefin such as polypropylene and polyethylene.

In an example structure of the secondary battery, an electrode group and a non-aqueous electrolyte are accommodated in an outer package, and the electrode group has a positive electrode and a negative electrode wound with a separator interposed therebetween. Alternatively, instead of the wound-type electrode group, other forms of electrode groups may be applied, such as a laminated electrode group in which the positive electrode and the negative electrode are laminated with a separator interposed therebetween. The secondary battery may be any shape, for example, a cylindrical type, a rectangular type, a coin-type, a button type, or a laminate type.

FIG. 1 is a schematic perspective partially cutaway oblique view of a prismatic secondary battery according to an embodiment of the present disclosure.

The battery includes a bottomed rectangular battery case 4, and an electrode group 1 and a non-aqueous electrolyte accommodated in the battery case 4. The electrode group 1 has a negative electrode in the form of a long strip, a positive electrode in the form of a long strip, and a separator interposed therebetween. The negative electrode current collector of the negative electrode is electrically connected to a negative electrode terminal 6 provided in a sealing plate 5 through a negative electrode lead 3. A negative electrode terminal 6 is insulated from the sealing plate 5 with a resin-made gasket 7. A positive electrode current collector of the positive electrode is electrically connected to a rear face of the sealing plate 5 through a positive electrode lead 2. That is, the positive electrode is electrically connected to the battery case 4 also serving as a positive electrode terminal. The periphery of the sealing plate 5 is fitted to the open end of the battery case 4, and the fitting portion is laser welded. The sealing plate 5 has an injection port for a non-aqueous electrolyte, and is sealed with a sealing plug 8 after injection.

The structure of the secondary battery may be cylindrical, coin-shaped, button-shaped, or the like having a metallic battery case, or may be a laminated battery having a laminated sheet battery case made of a laminated body of a barrier layer and a resin sheet. In the present disclosure, the type, shape, and the like of the secondary battery are not particularly limited.

In the following, the present disclosure will be described in detail based on Examples and Comparative Examples, but the present disclosure is not limited to Examples below.

Examples 1 to 8

[Positive Electrode Production]

Lithium fluoride (LiF), lithium peroxide ($Li_2O_2$), and lithium manganate ($LiMnO_2$) are mixed at a predetermined mass ratio. The mixed powder was introduced into a planetary ball mill (Premium-Line P7 manufactured by Fritsch, number of revolution: 600 rpm, vessel: 45 mL, ball: ϕ 3 mm Zr made balls), and treated in an Ar atmosphere at room temperature for 35 hours (35 cycles of 1 hour treatment followed by 10 minutes rest), thereby producing a lithium metal composite oxide having a composition shown in Table 1.

The produced lithium metal composite oxide, acetylene black, and polyvinylidene fluoride were mixed at a solid content mass ratio of 7:2:1, and using N-methyl-2-pyrrolidone (NMP) as a dispersion medium, a positive electrode mixture slurry was prepared. Then, the positive electrode mixture slurry was applied onto a positive electrode core composed of aluminum foil, the coating film was dried and rolled, and then cut into a predetermined electrode size, thereby producing a positive electrode.

[Preparation of Electrolyte]

To a solvent mixture in which ethylene carbonate (EC), ethyl methyl carbonate (EMC), and dimethyl carbonate (DMC) were mixed at a predetermined volume ratio. $LiPF_6$ was added as a lithium salt, thereby preparing an electrolyte.

[Preparation of Test Cell]

Using the above-described positive electrode and a negative electrode counter electrode composed of lithium metal foil, a test cell was produced. An electrode body was composed by placing the above-described positive electrode to face the negative electrode counter electrode with a separator interposed therebetween, and the electrode body was accommodated in a coin-shape outer can. The electrolyte was injected into the outer can, and then the outer can was sealed to obtain a coin-shape secondary battery.

In Examples 1 to 8, the composition of the lithium metal composite oxide was changed as shown in Table 1, thereby producing secondary batteries A1 to A8 for testing.

Comparative Example 1

In production of the positive electrode, lithium manganate ($LiMnO_2$) was introduced into a planetary ball mill (Premium-Line P7 manufactured by Fritsch, number of revolution: 600 rpm, vessel: 45 mL, ball: ϕ 3 mm Zr made balls), and treated in an Ar atmosphere at room temperature for 35 hours (35 cycles of 1 hour treatment followed by 10 minutes rest).

Except for the above, a test secondary battery B1 was produced in the same manner as in Example 1.

Comparative Example 2

In production of the positive electrode, lithium fluoride (LiF), and lithium manganate ($LiMnO_2$) were mixed at a predetermined mass ratio. The mixed powder was introduced into a planetary ball mill (Premium-Line P7 manufactured by Fritsch, number of revolution: 600 rpm, vessel: 45 mL, ball: ϕ 3 mm Zr made balls), and treated in an Ar atmosphere at room temperature for 35 hours (35 cycles of 1 hour treatment followed by 10 minutes rest), thereby producing a lithium metal composite oxide $L_{1.15}Mn_{0.85}O_{1.7}F_{0.3}$.

Except for the above, a test secondary battery B2 was produced in the same manner as in Example 1.

[Evaluation]

(Initial Discharge Capacity)

The secondary battery was subjected to constant current charging under a normal temperature environment at a constant current of 0.05 C until reaching a battery voltage of 4.95 V. Afterward, the batteries were allowed to rest for 20 minutes, and subjected to constant current discharge at a constant current of 0.05 C until reaching a battery voltage of 2.5 V, and the discharge capacity was measured. The discharge capacity per mass of the positive electrode active material (lithium metal composite oxide) was determined, and set as the initial discharge capacity $C_0$.

Table 1 shows the evaluation results for the initial discharge capacity $C_0$, along with the composition of the lithium metal composite oxide used for the positive electrode active material in Examples 1 to 8 and Comparative Examples 1 and 2. Table 1 also shows the molar ratio x of vacancies (=2−a−b−c), when the composition of the lithium metal composite oxide used in Examples is represented as $Li_aMn_bMcO_{2-d}F_d$.

In the crystal structure of the lithium metal composite oxide used in Examples 1 to 8, vacancies are present in cation sites at a molar ratio x of vacancy in the range of $0.05 \leq x \leq 0.25$. Meanwhile, in the crystal structure of the lithium metal composite oxide used in Comparative Examples 1 and 2, the molar ratio x of vacancy is theoretically 0, and vacancies are substantially not present in cation sites.

As shown in Table 1, the battery B1 of Comparative Example 1 had an extremely small initial discharge capacity $C_0$. Meanwhile, in the battery B2 of Comparative Example 2, the initial discharge capacity $C_0$ improved compared with the battery B1 by introduction of fluorine.

In the batteries A1 to A8 of Examples 1 to 8, the initial discharge capacity $C_0$ improved even more compared with the battery B2.

TABLE 1

| Battery | Lithium metal composite oxide | Vacancy Ratio x | Discharge capacity (mAh/g) |
|---|---|---|---|
| A1 | $Li_{1.15}Mn_{0.80}O_{1.7}F_{0.3}$ | 0.05 | 313 |
| A2 | $Li_{1.15}Mn_{0.75}O_{1.7}F_{0.3}$ | 0.1 | 324 |
| A3 | $Li_{1.10}Mn_{0.80}O_{1.7}F_{0.3}$ | 0.1 | 318 |
| A4 | $Li_{1.05}Mn_{0.70}O_{1.7}F_{0.3}$ | 0.25 | 283 |
| A5 | $Li_{1.05}Mn_{0.80}O_{1.7}F_{0.3}$ | 0.15 | 300 |
| A6 | $Li_{1.10}Mn_{0.75}O_{1.7}F_{0.3}$ | 0.15 | 327 |
| A7 | $Li_{1.15}Mn_{0.80}O_{1.8}F_{0.2}$ | 0.05 | 318 |
| A8 | $Li_{1.15}Mn_{0.75}O_{1.5}F_{0.5}$ | 0.1 | 309 |
| B1 | $MiMnO_2$ | 0 | 154 |
| B2 | $Li_{1.15}Mn_{0.85}O_{1.7}F_{0.3}$ | 0 | 269 |

INDUSTRIAL APPLICABILITY

With the secondary battery of the present disclosure, a secondary battery with a high capacity and also with excellent cycle characteristics can be provided. The secondary battery according to the present disclosure is useful for a main power source of a mobile communication device, a portable electronic device, or the like.

REFERENCE SIGNS LIST

1 Electrode Group
2 Positive Electrode Lead
3 Negative Electrode Lead
4 Battery Case
5 Sealing Plate
6 Negative Electrode Terminal
7 Gasket
8 Sealing Plug

The invention claimed is:

1. A positive electrode active material for a secondary battery comprising a lithium metal composite oxide, the lithium metal composite oxide having a crystal structure based on a rock salt structure belonging to a space group Fm-3m, wherein the crystal structure has a vacancy to which no lithium or metal atom is disposed, and the lithium metal composite oxide is represented by a composition formula $Li_aMn_bO_{2-d}F_d$ (where $1.05 \leq a \leq 1.15$, $0.7 \leq b \leq 0.8$, $0.2 \leq d \leq 0.5$ and $1.85 \leq a+b \leq 1.98$ are satisfied).

2. A secondary battery comprising a positive electrode, a negative electrode, an electrolyte, and a separator interposed between the positive electrode and the negative electrode, wherein the positive electrode includes the positive electrode active material for a secondary battery of claim 1.

* * * * *